(No Model.)

B. F. APPLEGATE.
SHAFT COUPLING.

No. 349,678. Patented Sept. 28, 1886.

WITNESSES:
Donn Turtchell.
C. Sedgwick.

INVENTOR:
B. F. Applegate
BY Munn & Co.
ATTORNEYS.

UNITED STATES PATENT OFFICE.

BENJAMIN F. APPLEGATE, OF NEW ALBANY, INDIANA.

SHAFT-COUPLING.

SPECIFICATION forming part of Letters Patent No. 349,678, dated September 28, 1886.

Application filed January 22, 1886. Serial No. 189,374. (No model.)

*To all whom it may concern:*

Be it known that I, BENJAMIN F. APPLEGATE, of New Albany, in the county of Floyd and State of Indiana, have invented a new and Improved Shaft-Coupling, of which the following is a full, clear, and exact description.

My invention relates to couplings of that class used to couple the ends of two aligned shafts which transmit power to drive machinery; and the object of the invention is to provide a simple, inexpensive, and effective clutch of this character which will drive the coupled shafts either way without lost motion or backlash, and in which the wear incident to long use of the coupling may readily be taken up.

The invention consists in certain novel features of construction and combinations of parts of the shaft-coupling, all as hereinafter fully set forth.

Reference is to be had to the accompanying drawings, forming part of this specification, in which similar letters of reference indicate corresponding parts in all the figures.

Figure 1:
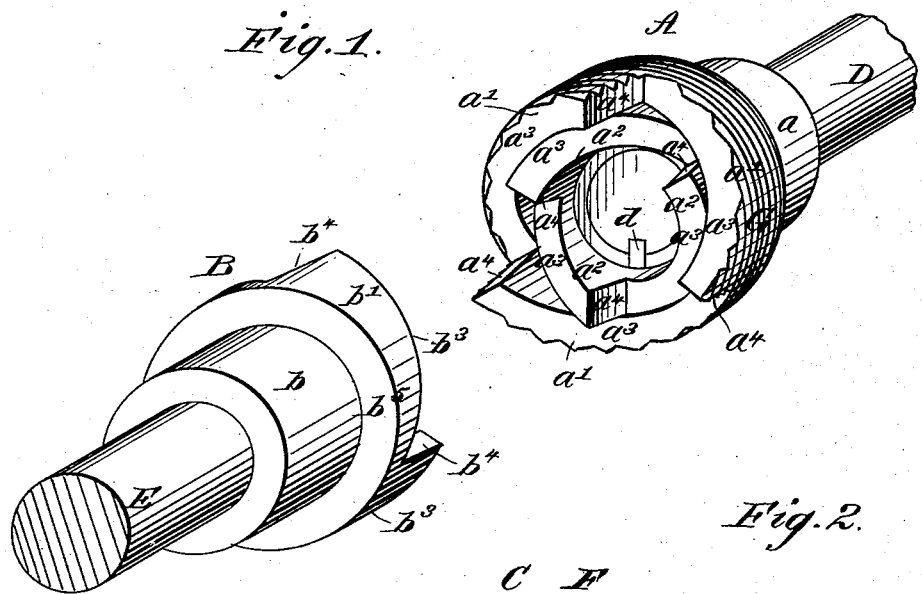
Figure 2:
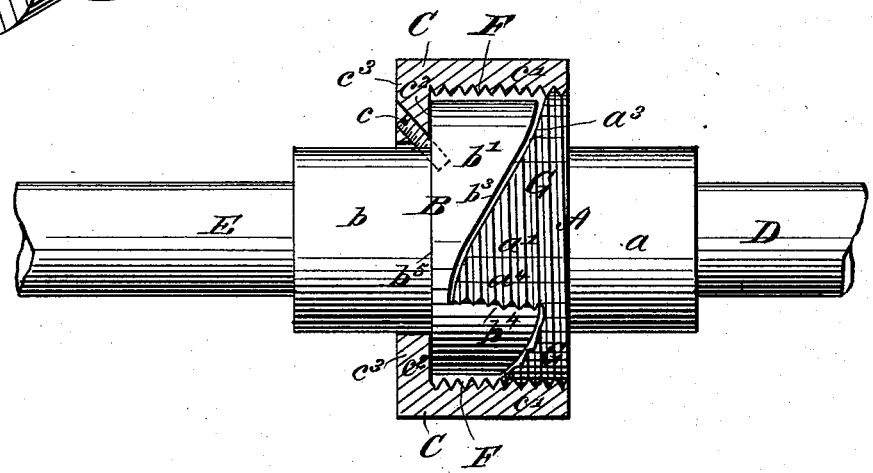
Figure 3:
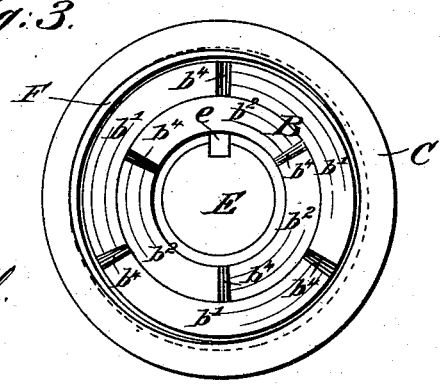

Figure 1 is a perspective view of the ends of two shafts with the coupling half-clutches or sections applied thereto and separated, the screw-sleeve being removed. Fig. 2 is a side view of the coupling, the sleeve being shown in section on the line of the shafts; and Fig. 3 is an inner face view of one part or section of the coupling with the screw-sleeve attached.

The coupling consists of the two opposite half-clutches or sections A B and a screw-sleeve, C, which unite the shafts D E in alignment, as presently described. The coupling-section A is fixed to the end of shaft D by a key, $d$, and the coupling-section B is fixed to the end of shaft E by a key, $e$, said sections A B having hubs $a$ $b$, respectively, giving them long bearings on their respective shafts.

The coupling-sections A B are provided on their opposing faces with the two annular series of clutch-teeth $a'$ $a^2$ and $b'$ $b^2$, respectively, said teeth each having one inclined edge or face, $a^3$ $b^3$, respectively, and a driving-shoulder, as at $a^4$ $b^4$, respectively, and these driving-shoulders face reverse ways in the opposite clutch-sections, and are beveled backward from the roots to the points of the teeth, as clearly shown in the drawings.

The teeth $a'$ $a^2$ $b'$ $b^2$ of the respective clutch-sections A B are so shaped that when their backwardly-beveled driving-faces $a^4$ $b^4$ meet, when the clutch is first used, their inclined edges or faces $a^3$ $b^3$ will be separated a little, as shown in Fig. 2, and whereby the beveled driving-faces may be drawn up one on the other to take up any wear which may be caused by long-continued use.

It is obvious that by the reverse arrangement of the driving-shoulders or faces $a^4$ $b^4$ of the two series of teeth $a'$ $a^2$ $b'$ $b^2$ of the half-clutches A B, the shafts coupled by them may be rotated in either direction. I prefer to make the inner series of teeth, $a^2$ $b^2$, of clutch-sections A B shorter than their outer series of teeth, $a'$ $b'$, and also to arrange the driving-shoulders of the two series of teeth on each section opposite the lengthwise centers of the adjacent teeth, as shown clearly in the clutch-section A in Fig. 1, whereby the two series of teeth will be side-lapped bodily on each other when the clutch-sections are connected to couple the shafts.

The peripheral or outer faces of the teeth $b'$ of clutch-section B have a smaller diameter than the peripheral faces of the teeth $a'$ of clutch-section A, and whereby when the sections A B are placed together, as in Fig. 2, the internal screw-threads, F, on the flange portion $c'$ of the screw-sleeve C will slip over the teeth $b'$ of clutch-section B, and will engage the external screw-threads, G, on the outer faces of the teeth $a'$ of clutch-section A, and whereby the shoulder $c^2$ at the inner face of the disk or part $c^3$ of the sleeve C may be drawn up tightly to the shoulder $b^5$ at the back of the teeth of section B, while the screws F G draw the driving shoulders or faces $a^4$ $b^4$ of the clutch-sections A B tightly to each other. The disk portion $c^3$ of sleeve C is centrally apertured to pass freely over the hub $b$ of the clutch-section B.

When the clutch-sections A B are connected by the screw-sleeve C, as last above described, a screw, $c$, will be set into the section B through the sleeve C, to hold the latter against turning back off the threads on the section A, and lock all the parts securely in place. Any other suitable key or dog device may be used to lock the sleeve C to the clutch-section B, as may be preferred.

It is evident that with the shaft-coupling thus arranged the shafts D E will be coupled rigidly in perfect alignment, so they will run truly in either direction. Furthermore, there are no bolts or pins projecting from the coupling to catch on the clothing of persons adjusting or oiling the shafts or their hangers, or adjusting belts to pulleys on the shafts, and accidents from this cause will be avoided.

For the purpose of facilitating the placing of driving-pulleys on the shafts D E or their removal therefrom the half-clutches A B of the coupling may be fixed to the shafts in any approved way allowing their ready removal therefrom.

Having thus described my invention, I claim as new and desire to secure by Letters Patent—

1. The combination, in a shaft-coupling, of half-clutches A B, fixed to shafts D E, and having interlocking driving-shoulders, and said half-clutch A having peripheral screw-threads G, an internally-screw-threaded sleeve, C, fitted over one half-clutch and engaging the threads G of the other half-clutch, and a fastening screw or device, as at c, securing the sleeve to one of the half-clutches, substantially as and for the purposes herein set forth.

2. The combination, in a shaft-coupling, of half-clutches A B, fixed to shafts D E, and provided each with interlocking teeth having separated inclined faces and driving-shoulders which are beveled backward from the roots to the points of the teeth, and said half-clutch A provided with peripheral screw-threads G, and a sleeve, C, having internal screw-threads, F, and fitted over half-clutch B, and engaging the threads G of half-clutch A, substantially as and for the purposes herein set forth.

3. The combination, in a shaft-coupling, of half-clutches A B, fixed to shafts D E, and provided each with two annular series of teeth having driving-shoulders facing reverse ways and adapted to drive the coupled shafts in reverse directions, and half-clutch A having peripheral screw-threads G, and a sleeve, C, having internal screw-threads, F, and fitted over half-clutch B, and engaging the threads G of half-clutch A, substantially as herein set forth.

4. The combination, in a shaft-coupling, of half-clutches A B, fixed to shafts D E, and provided each with two annular series of teeth which face reverse ways in each half-clutch, and also provided with separated inclined faces and with driving-shoulders which are beveled backward from the roots to the points of the teeth, and said half-clutch A having peripheral screw-threads G, and a sleeve, C, having internal screw-threads, F, and fitted over half-clutch B, and engaging the threads G of half-clutch A, substantially as and for the purposes herein set forth.

BENJAMIN F. APPLEGATE.

Witnesses:
JOHN H. STOTSENBURG,
GEORGE B. CARDWILL.